United States Patent [19]

Miyakoshi et al.

[11] 4,243,132
[45] Jan. 6, 1981

[54] SPEED CONTROLLER FOR THE ROLLING CYLINDRICAL ARTICLES

[75] Inventors: Isamu Miyakoshi, Osaka; Kenji Ito, Fujiidera; Hideo Azuma, Otsu; Fukuzo Kitakaze, Takatsuki; Takamichi Tomotaki, Kobe; Yasuo Takehara, Kashiwara, all of Japan

[73] Assignee: Hankyu Zouki Kogyo Kabushiki Kaisha, Osaka, Japan

[21] Appl. No.: 929,230

[22] Filed: Jul. 31, 1978

[30] Foreign Application Priority Data

Sep. 6, 1977 [JP] Japan .................. 52-107621
Oct. 4, 1977 [JP] Japan .................. 52-134032

[51] Int. Cl.² .................................... B65G 11/20
[52] U.S. Cl. ...................... 193/40; 198/766; 188/1 B; 188/268
[58] Field of Search ............... 193/2 B, 32, 38, 40; 198/766, 614, 774, 534; 188/1 B, 266, 268

[56] References Cited

U.S. PATENT DOCUMENTS

| 2,374,663 | 5/1945 | Carrian | 198/766 |
| 3,882,981 | 5/1975 | Izumidate | 193/40 |

FOREIGN PATENT DOCUMENTS 1256505 12/1971 United Kingdom ............... 193/40

Primary Examiner—Robert B. Reeves
Assistant Examiner—Gene A. Church
Attorney, Agent, or Firm—Browdy and Neimark

[57] ABSTRACT

In an apparatus in which cylindrical articles violently collide with one another as they roll down on the inclined skid rails, from the inlet to the outlet thereof, a control rail covered thick with a soft and elastic foamed substance is located. The control rail is positioned side by side in parallel to the skid rails, and frequently reciprocated vertically to brake the articles as they move downwards over the skid rails so that the maximum rolling speed is sufficiently reduced for restricting the noise of collision below an allowable level.

9 Claims, 6 Drawing Figures

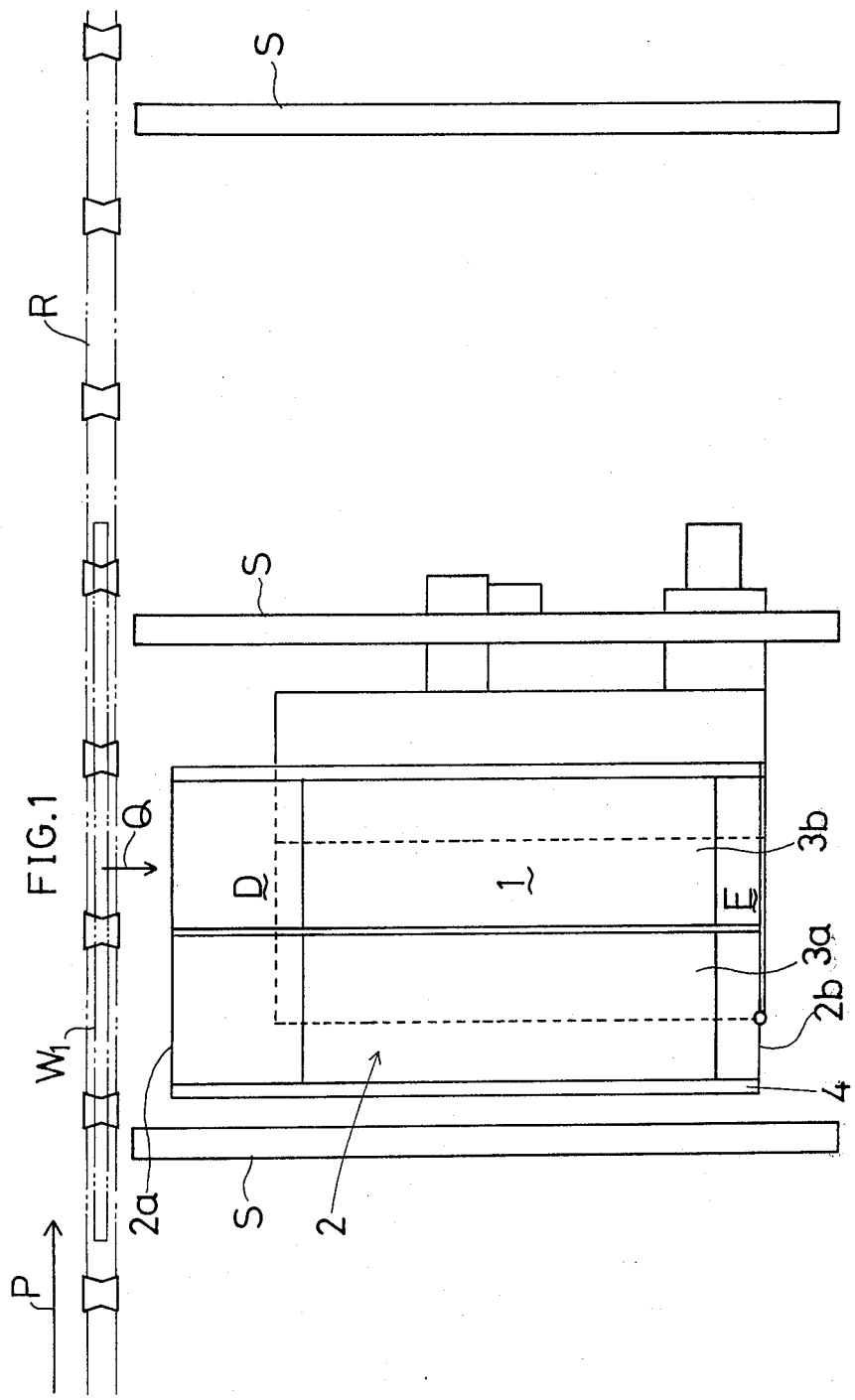

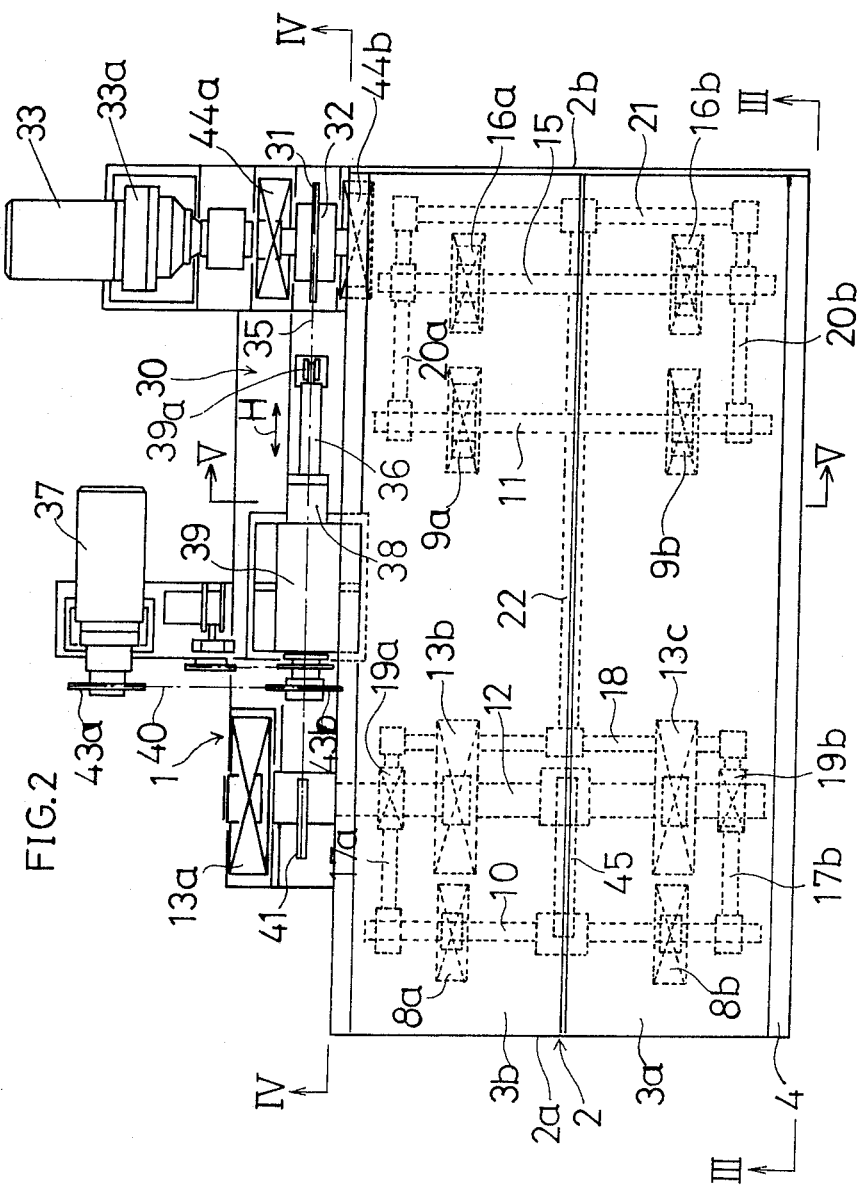

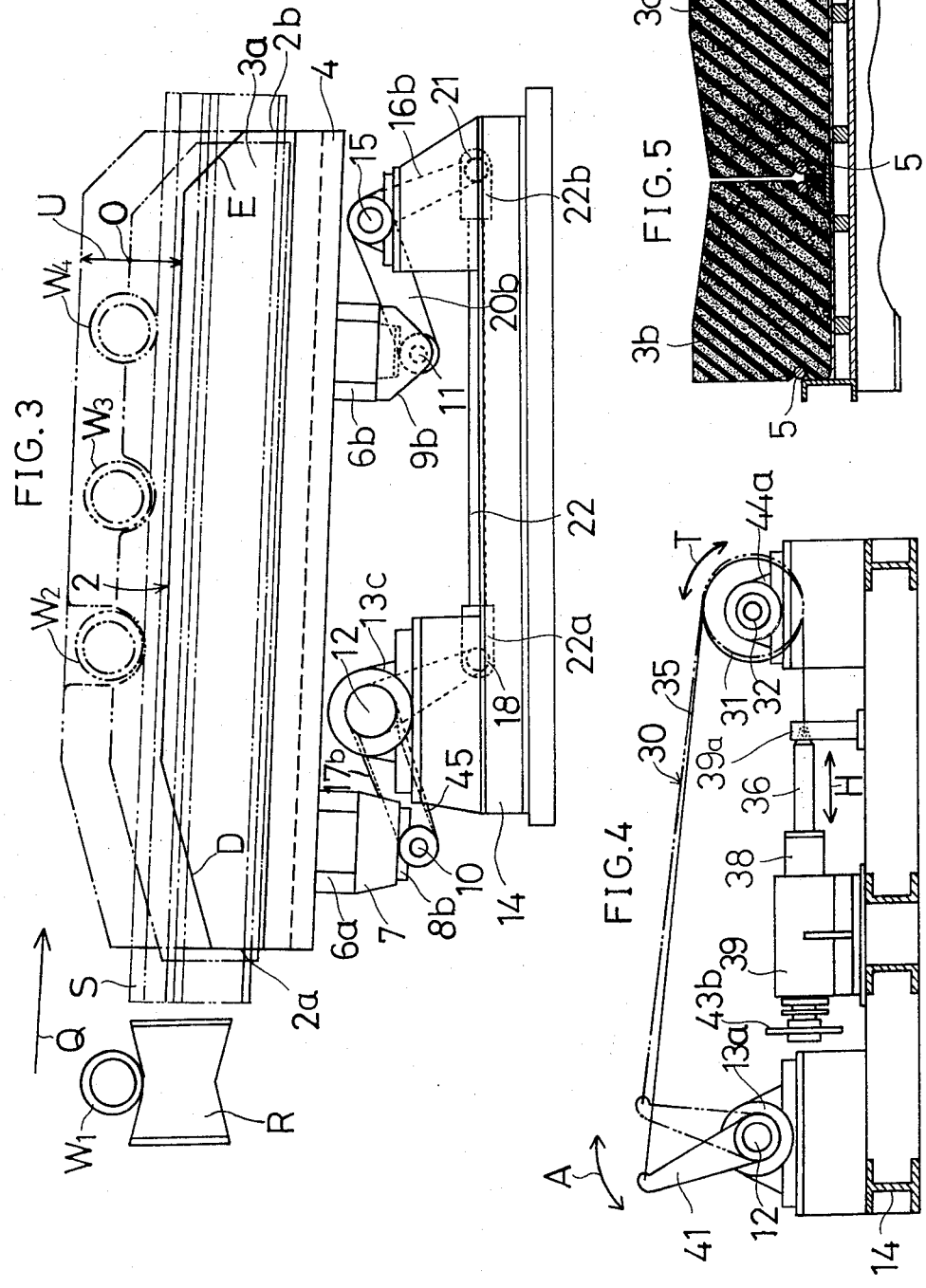

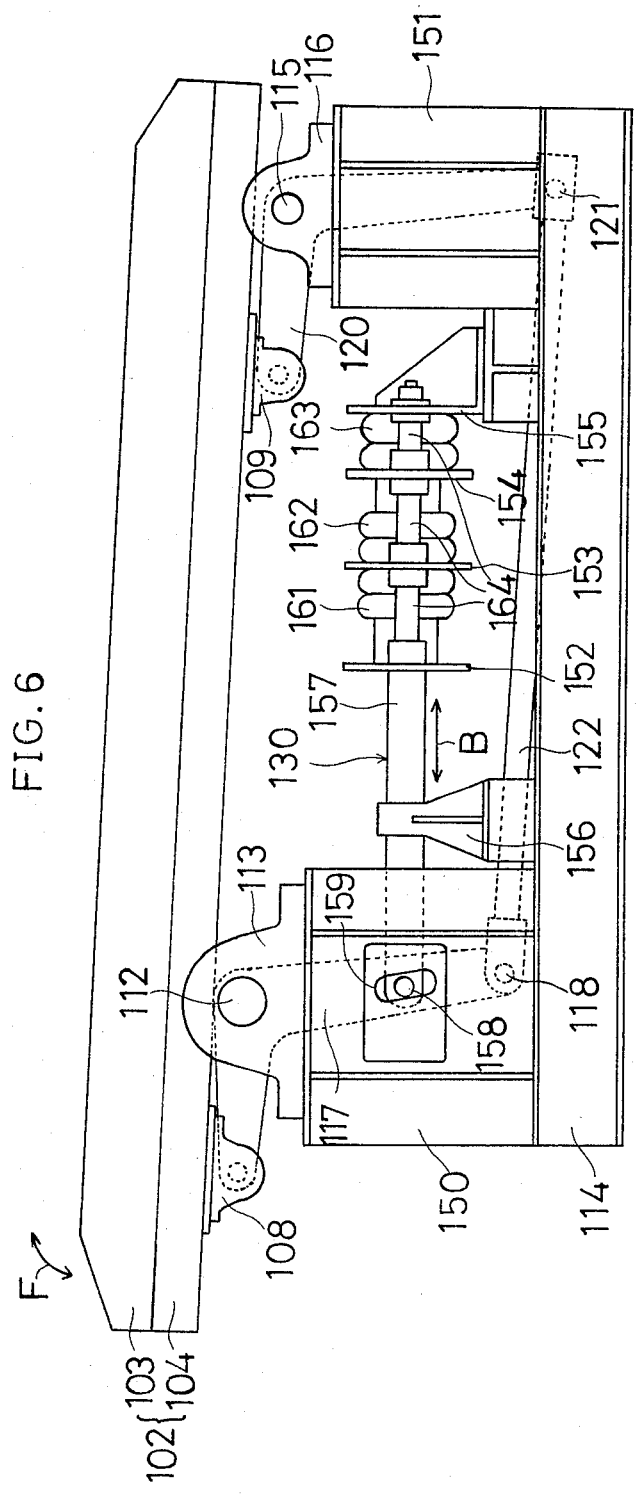

SPEED CONTROLLER FOR THE ROLLING CYLINDRICAL ARTICLES

BACKGROUND OF THE INVENTION

This invention relates to an apparatus which reduces the rolling speed of cylindrical articles, for example, pipes, rods or the like on inclined skid rails.

In parts of ironworks where cylindrical articles are manufactured, several kinds of roller conveyor lines are installed for the purpose of transporting the articles, inside of factories. The lines are often coupled to one another via skid rails. The skid rails are used for several purposes, for instance, changing the relative direction between the lines and temporary storing of the articles for inspection.

The skid rails, however, have certain disadvantages. The pipes or the like rapidly roll fast on the rails and collide violently with one another especially when they are being stopped for rolling at the outlet of the rails. As the result, the cylindrical articles make high intensity sounds which result in considerable discomfort not only to the workers but also to the neighbors living near to the factories being operated day and night. In many jurisdictions, laws and regulations have been enacted to oblige the owner or the managers of factories to reduce the level of noise. Accordingly, effective methods and apparatus are now desirable and often required to reduce noise levels required. Various apparatuses have been devised in order to reduce noise.

For instance, an apparatus using electromagnetic devices has been proposed in which many electromagnetic coils and proximity switches are mounted at intervals adjacent the skid rails. These coils are alternately empowered when the switches detect the position of the cylindrical articles to be stopped. However, this known apparatus is expensive to construct and install and to operate because the apparatus is complicated in structure and consumes considerable electric power. The cylindrical articles become magnetised by the apparatus and the residual magnetism may exert, in many cases, undesirable influence in following process steps and uses. Furthermore, the apparatus cannot be used for pipes or the like made of non-magnetic materials, for example, stainless steel.

Another type of apparatus also has been proposed in which an endless chain located near to skid rails is rotated in the same direction of the transportation of pipes or the like. Many braking attachments are provided at regular intervals along the chain. The heads of the attachments protrude above the skid rails so that they can act as brakes while the cylindrical articles slowly roll on the rails. The disadvantages of this type of known apparatus are caused by the fixed placement intervals of the attachments. When a kind of pipe whose diameter is slightly greater than the interval is dealt with, many pipes extend in a row and in contact with one another to load some attachment with too much weight. On the contrary, when the diameter of the pipes is much smaller than the interval, the attachments lose smoothness in their braking action.

There has been proposed still another apparatus in which a considerable number of flexible spring plates are fixed to a base plate in parallel with the skid rails. The heads of the spring plates are projected above the skid rails to brake pipes rolling on the skid rails. Although the degree of the projection is adjustable, it is difficult to gain always an optimum resiliency effect. Smaller pipes are likely to be repelled backwards.

SUMMARY OF THE INVENTION

The principal object of the present invention is to provide an apparatus by which the maximum rolling speed of any cylindrical articles can be easily and precisely reduced below desired level.

Another object of the present invention is to provide an apparatus which can be inexpensively installed and economically operated.

A speed controlling apparatus of this invention in use is positive near to, and in parallel with the above-mentioned skid rails. The apparatus includes an inclined control rail, a supporting construction and a reciprocating mechanism. Said control rail has a thick layer made from a soft elastic foamed substance which is attached to the upper surface of inclined rigid base plates. The layer may be formed by foam rubber, or elastic foamed plastic, for example, polyethylene foam, polyurethane foam or the like. The supporting construction is essentially constructed with L-shaped arms, one being located near to the inlet end of the control rail and the other near to the outlet of the said. The arms are rotatably connected to the lower surfaces of the base plates, at their to one extremity, and linked one another at their respective extremities. The elbow portions of the arms are rotatably supported by bearing blocks fixed to the apparatus frame.

The above-mentioned reciprocating mechanism is linked to one of the suitable portions of the supporting construction. For example, the mechanism may be linked to the connecting rod linking the L-shaped arms, or to the arms themselves. The type of reciprocating mechanism can be also chosen from various known mechanisms, namely, a device comprising an eccentric cam, a crankshaft, a fluid cylinder, air bellows or the like is available. A complex device also is available under certain circumstances which consists of two or more mechanisms.

As supposed from the above description, the control rail is substantially vertically reciprocated always in parallel with the skid rails. It is an important feature of this invention that the center of reciprocation, the frequency of reciprocation and the stroke of reciprocation are adjustable.

The first parameter, namely, the center of reciprocation is, for example, adjusted by changing the length of a linear flexible member, such as a chain or wire rope spanned between an eccentric cam and the driving shaft in the supporting construction. The adjusting mechanism may be separated from, or included in, the main portion of the reciprocating mechanism.

The frequency, as the second parameter, is adjusted by changing the revolution numbers of the cam, for example. The stroke, the third parameter is, for example, changed by substituting the cam with another cam which has a different eccentricity.

When the control rail is situated at the highest level or near to it, the pipes or the like sink deep into the abovementioned layer. Accordingly, they stand still on the skid rails by the braking effect of the layer. When the control rail is situated at the lowest level or near to it, they part from or scarcely sink into the layer. As the result, their rolling motions directed toward the outlet of the skid rails is accelerated until they again contact or sink into the layer of the control rail.

It is noted that the objects of the present as well as others, invention are accomplished by the above-described apparatus.

In the first place, by the good adjustability of three operating parameters, mentioned above, the action of the apparatus can easily and precisely be fitted to a variety of cylindrical articles which differ in diameter and/or weight. The regulation of only one or two parameters is sufficient for this purpose in certain cases.

In the second place, the conciseness of the apparatus structure brings about several advantages as set out in the text below. Reduced capital investment and easy maintenance are attained. The operating cost of the apparatus is not as high as for the known electromagnetic apparatus. The rolling inertia is naturally reduced and the energy absorbed by the soft layer in the apparatus of the invention, on the contrary, the same is forcibly cut down by the electromagnetic units consumpting much electric energy in the previously known apparatus.

The other advantages will be understood from the following explanation of embodiments illustrated with the attached drawings.

BRIEF DESCRIPTION OF THE DRAWINGS

FIG. 1 is a schematic plan view of a first embodiment of a speed controlling apparatus according to the present invention;

FIG. 2 is an enlarged plan view of the embodiment of FIG. 1;

FIG. 3 is a side elevation seen from III—III line of FIG. 2;

FIG. 4 is a transverse section taken on section lines IV—IV of FIG. 2;

FIG. 5 is a partial transverse section taken on section line V—V of FIG. 2;

FIG. 6 is a side elevation of a second embodiment of a speed controlling appratus according to the present invention;

DESCRIPTION OF THE PREFERRED EMBODIMENTS

Figure 7:
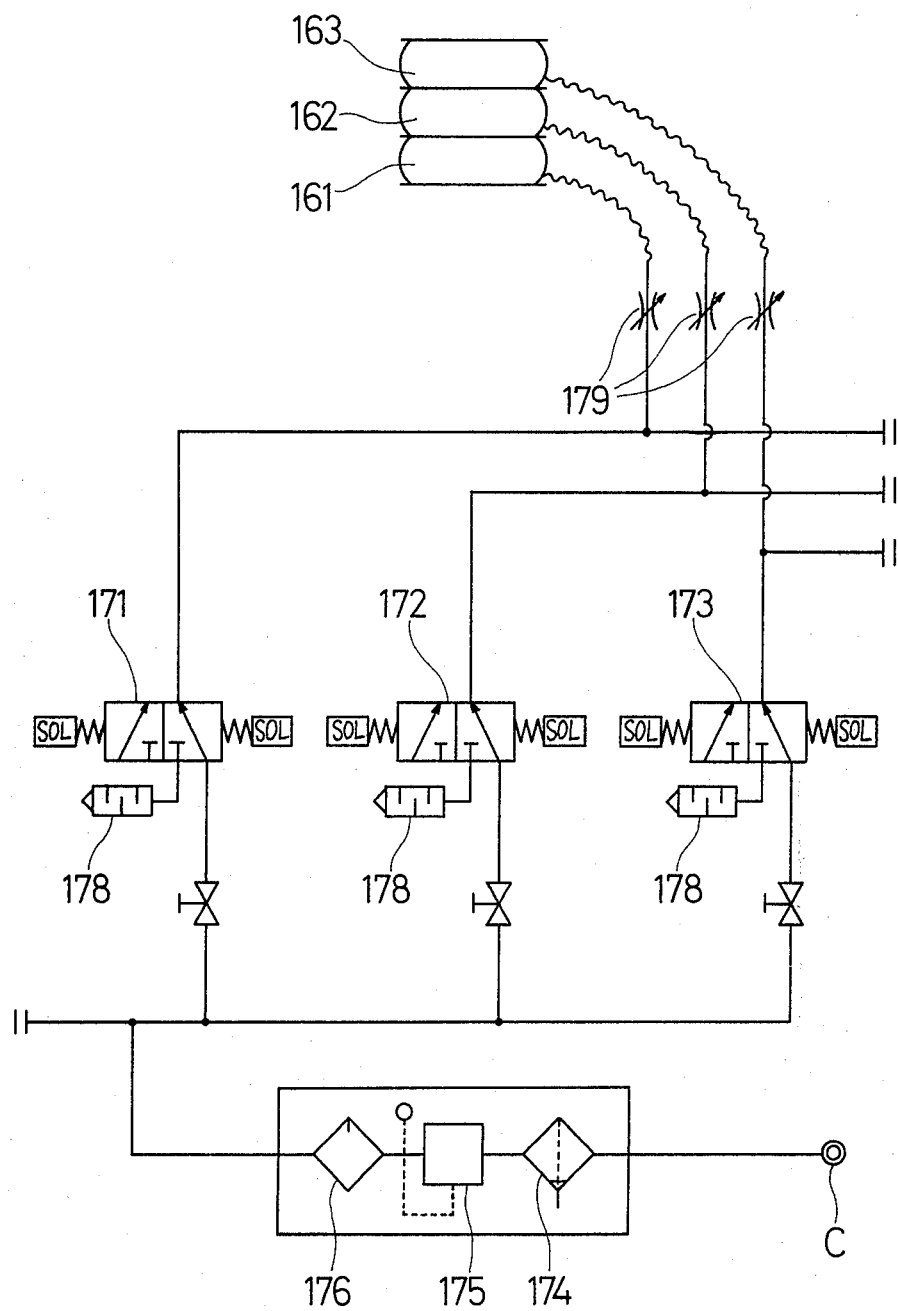
FIG. 7 is a schematic diagram of a pneumatic circuit used in the embodiment illustrated in FIG. 6.

As shown in FIG. 1, the speed controlling apparatus 1 is located between two skid rails S. As shown in FIGS. 1—5 illustrating the first embodiment, the control rail 2 is composed of the two identically shaped foam rubber layers 3a and 3b fixed onto the upper face of a iron base plate 4. Welded bars 5 thrust into the sides of the layers 3a and 3b to hold them in place, as best seen in FIG. 5.

As seen in FIG. 3, lateral beams 6a and 6b are welded to the lower surface of the base plate 4, these beams and plate forming a rectangle. Near to the inlet end 2a of the control rail 2, bearing blocks 8a and 8b are attached to a beam 6a, the spacer 7 being interposed between them.

Bearing blocks 9a and 9b are directly attached to the beam 6b. A shaft 10 is rotatably supported by the blocks 8a and 8b, and a shaft 11 is similarly supported by the blocks 9a and 9b. A driving shaft 12 is rotatably supported by bearing blocks 13a, 13b and 13c (shown in FIG. 2) which are fixed to the base of a frame 14 near to the inlet end 2a of the rail 2 with proper spacers (shown in FIG. 3) being interposed between them.

A shaft 15 is similarly supported by bearing blocks 16a and 16b near to the outlet end 2b of the rail.

L-shaped arms 17a and 17b are fixed at their upper ends of the shaft 10, and fixed at their lower ends to a rod 18, thus one pair of arms being formed. The arms 17a and 17b are freely supported at their elbow-shaped portions by the above-mentioned driving shaft 12 with bearing blocks 19a and 19b.

On the other hand, other L-shaped arms 20a and 20b are fixed to the shaft 11 at their upper ends, and also fixed to a rod 21 so that another pair of arms is formed. The arms 20a and 20b are fixed to the shaft 15 at their elbow-shaped portions.

The above-described rods 18 and 21 are linked to one another by a connecting rod 22.

The driving shaft 12 is rotated within a certain angular range alternately clockwise and anticlockwise, by the reciprocating mechanism 30. The mechanism 30 shown in FIG. 2 and FIG. 4 is essentially composed of two parts. The one part comprises a motor 33 attached with a variable reducer 33a. The motor 33 rotates an eccentric cam 32 in the arrowed direction T, consequently giving an eccentric rocking motion to the chain wheel. The second part comprises a reversible motor 37 provided with a magnetic brake. The motor 37 pulls or pushes a screw 36 in the arrowed direction H. One end of a chain 35 is fixed to the screw 36.

A cylinder 38 having an interior thread is rotatably supported by a housing 39 and a stopper 39a is extended from the frame base to the unthreaded end of the screw 36 so that this screw can not revolve but moves only linearly.

The numeral 40 indicates a chain which is spanned between a chain wheel 43a of the motor 37 and a similar wheel 43b of the cylinder 38. Another end of the chain 35 is connected via a lever 41 fixed to the driving shaft 12. The numerals 44a and 44b indicate chainwheels.

The numeral 45 indicates a lever respective ends of which are respectively fixed to the shaft 10 and the driving shaft 12. Thus, the lever 45 links the supporting construction and the reciprocating mechanism.

The motion and operation of the apparatus thus far described is now explained.

When the kind of cylindrical articles to be processed is changed, the center of reciprocation is adjusted if necessary. In concrete terms, the reversible motor 37 is clockwise or reversely run to a certain degree in order to set the screw 36 at the desired position. Then the frequency of reciprocation, only in case of necessity, is adjusted by changing the reducing ratio of the revolution of the output shaft of the motor 33. The chain wheel 31 rocks forward to the lever 41 and backward, thus this lever swings with the desired frequency in the arrowed direction A shown with a chain line and solid line in FIG. 4.

The driving shaft 12 is consequently rotated alternately clockwise and anticlockwise within a certain angular range and with the selected frequency, the shaft 10 being synchronously driven by the lever 45.

As the result, the control rail 2 reciprocates in a manner as shown with chain lines in FIG. 3. The driving force applied to the shaft 12 is evenly transmitted to the control rail by means of the supporting construction. It will be understood that the anticlockwise returning motion of the lever 41 in FIG. 4 is caused by the gravity of the control rail 2 loaded to the driving shaft 12 via the lever 45.

The reciprocation stroke indicated with the arrow U can be changed, if necessary, by replacing the eccentric cam 32 with other cams, each having a different eccentricity. However, in general, the optimum control effect can be usually attained only by adjusting one or two parameters other than the stroke. The dot O marked on the arrow U indicates the center of reciprocation.

Onto the control rail 2 in the above-described condition, the pipes or the like which are being transfered in the arrowed direction P on the roller conveyor line R are fed in the arrowed direction Q when they reach the position $W_1$.

In this embodiment, the upper surface of the foam rubber layers $3a$ and $3b$ are tapered at their portions near to the inlet end, as shown with the symbol D in FIG. 3. The pipes or the like can smoothly ride on the control rail 2 wherever the vertical position of said rail may be.

While the pipes or the like roll downwards to the outlet end $2b$ on the control rail 2, they are intermittently braked by the foam rubber. The braking is schematically illustrated in FIG. 3 by the symbols $W_2$, $W_3$ and $W_4$. Each pipe is repeatedly and orderly subjected to said brakage. Namely, the state of the symbol $W_2$ is followed by the state of the symbol $W_3$. The state of the symbol $W_3$ is then in turn followed by the state of the symbol $W_4$. Then the state $W_4$ is followed by the state $W_3$ being followed by the state $W_2$. There are many intermediate states, as a matter of course, between the typically illustrated states.

The cylindrical articles in the state $W_2$ sink deep into the foam rubber, being fully braked. In the state $W_3$ the lower halves of the articles contact with the rubber, they scarcely roll or come to halt. It is noted that almost all weights of the articles in the state $W_2$ and $W_3$ is supported by the skid rails S. The articles in the state $W_4$ roll freely downwards until they will be braked again by the rubber layers $3a$, $3b$. It is desireble in view point of the durability of the layers that the compression degree of the layers is limited below 50% in thickness.

The cylindrical articles stand in a row on the control rail 2 near to the outlet thereof. When the articles form a row, they collide softly one another. However, the collision noise can be kept extraordinary low, for example, below 80 phons because the maximum rolling speed of the articles is restricted.

The tapered parts E of the foam rubber layers $3a$, $3b$ near to the outlet $2b$ make smooth the kicking out motion to feed the articles to the next conveyor line or the other next processing line or station.

As illustrated in FIG. 5 the upper surface of the foam rubber layers $3a$, $3b$ is V-shaped in cross section so that the braking force is naturally adjusted when the diameter or the weight per unit length of the cylindrical articles changes. In the event the articles of smaller diameter are processed, the articles sink only into both side portions of the rubber and suffer a lesser braking force. In the event the articles of larger diameter or heavier weight per unit length are processed, these articles sink into the wider portions of the rubber layer $3a$, $3b$ and are subjected to greater braking force. As the result, the need of a paramter adjustment is decreased by the above-mentioned shape of the foam rubber layers $3a$, $3b$.

The second embodiment is now explained in the following text.

A reciprocating mechanism 130 in FIG. 6 is different from the mechanism 30. Both embodiments, however, are similar in principal construction except for reciprocating mechanisms 30, 130.

Each L-shaped arm 117 and 120 is rotatably connected at its higher end to a under surface of the control rail 102, near to the inlet and outlet thereof. The rail 102 has polyurethane foam 103 attached to its upper surface of the base plate 104. Numeral 108 and 109 indicate bearing blocks.

The arms 117 and 120 are respectively supported at their elbows by respective shafts 112 and 115 which are in turn mounted respectively to higher and the lower spacers 150 and 151 fixed to a frame base 114. The arms 117, 120 are linked at the lower ends thereof with connecting rod 122 via respective rods 118 and 121.

A series of air bellows 161, 162 and 163 is used as power source in the mechanism 130. The series of bellows is interposed between a movable end plate 152 and the fixed end plate 155, and partitioned off with intermediate plates 153 and 154.

All the plates are linked to each other with the expansible guide rods 164. The slidable rod 157 for conducting the expansion and contraction of the bellows 161, 162 and 163 is slidably supported at its central portion by a support 156. One end of the rod 157 is connected with the movable end plate 152, and the other end connected with a lateral rod 158 positioned in a long bore 159.

As seen from FIG. 7, the air bellows 161, 162 and 163 are individually controlled by solenoid valves 171, 172 and 173, respectively. The compressed air is fed to the valves via the air filter 174, a pressure-reducing valve 175 and an oiler 176.

Numeral 178 indicates silencers or mufflers which deaden the sound of air exhausted from the solenoid valves. Throttle valves 179 control the speed of the compressed air current.

Each solenoid valve is operated by any of a number of conventional electric circuits, for example, a sequencial control or a programm control electronic circuit.

For adjusting the center and stroke of the reciprocation of the control rail 102, the number of operated bellows is changed. When the number is increased the center will be raised and the stroke will be increased at the same time. In case only one bellows is operated, the reciprocation condition will be conversely changed.

The reciprocation frequency is, on the other hand, adjusted by the means of the above-mentioned electric circuit.

The frequency of expansion and contraction results directly in the reciprocation frequency of the control rail 102. The chosen air bellows can be synchronously or stepwise operated, and the rates of ascent and descent can be made different from one another. Furthermore, the staying times of said rail 102 at the highest position and the same at the lowest one also can be made different from one another.

Thus the expansion and contraction of the air bellows brings about the reciprocation in the arrowed direction B. The reciprocation of the rod brings about in turn the substantially vertical motion in the arrowed direction F to the rail 102 via the arm 117, the connecting rod 122 and the arm 120.

The braking force is applied in the same manner as in the first embodiment to the cylindrical articles by the polyurethane foam layer 103.

It is to be understood that the foregoing text and accompanying figures of drawing have been set out by way of example, not by way of limitation. Other embodiments and variants are possible within the spirit and scope of the invention, its scope being defined by the appended claims.

What is claimed is:

1. A speed controlling apparatus for cylindrical articles which are to roll on inclined skid rails from an inlet to an outlet thereof, the apparatus comprising: a control rail, located substantially in parallel to said skid rails and near thereto, said control rail including at least one base plate and thick layer of a soft resilient substance attached to an upper surface of said base plate; a supporting construction composed of a front L-shaped arm having an upper end, an elbow-shaped portion and a lower end located near to said inlet, a rear L-shaped arm having an upper end, an elbow shaped portion and a lower end located near to said outlet, each said arms being rotatably attached at respective said upper ends to a lower surface of said base plate of said control rail and being rotatably supported by a frame base at respective said elbow-shaped portions, said L-shaped arms being linked to one another at said lower ends by a connecting rod; and means for giving to said control rail a substantially vertical reciprocative motion.

2. A speed controlling apparatus according to claim 1, wherein said means for giving to said control rail a substantially vertical reciprocation comprise means for imparting to said control rail a reciprocative movement of variable center, magnitude of stroke and frequency.

3. A speed controlling apparatus according to claim 1 or 2, wherein said substance is foam rubber.

4. A speed controlling apparatus according to claim 3, wherein said layer is V-shaped in cross-section.

5. A speed controlling apparatus according to claim 1 or 2, wherein said substance is foam rubber and said layer is V-shaped in cross-section.

6. A speed controlling apparatus according to claim 1 or 2, wherein said substance is elastic foam plastic and said layer is V-shaped in cross-section.

7. A speed controlling apparatus according to claim 1 or 2, wherein said means for giving to said control rail reciprocative motion comprises a lever which reciprocates said control rail by means of said supporting construction around a driving shaft, a variably reduced motor which drives said driving shaft via at least one linear member spanned between a wheel supported by an eccentric cam and said driving shaft, and a reversible motor which regulates effective spanned length of said at least one linear member.

8. A speed controlling apparatus according to claim 1 or 2, wherein said means for giving to said control rod reciprocative motion comprises air bellows which are repeatedly controllably expanded and contracted by a pneumatic circuit, and a slidable rod which connects said bellows to said supporting construction.

9. A speed controlling apparatus according to claim 1 or 2, wherein said soft, resilient substance is a foamed substance.

* * * * *